(12) United States Patent
Hopkins

(10) Patent No.: US 8,754,557 B2
(45) Date of Patent: Jun. 17, 2014

(54) BOWLING MACHINE MOTOR/GEARBOX CONVERSION AND ADAPTOR KIT

(76) Inventor: Michael Hopkins, Kearney, NE (US)

(*) Notice: Subject to any disclaimer, the term of this patent is extended or adjusted under 35 U.S.C. 154(b) by 625 days.

(21) Appl. No.: 12/766,969

(22) Filed: Apr. 26, 2010

(65) Prior Publication Data

US 2010/0282010 A1 Nov. 11, 2010

Related U.S. Application Data

(60) Provisional application No. 61/176,186, filed on May 7, 2009.

(51) Int. Cl.
*H02K 7/102* (2006.01)

(52) U.S. Cl.
USPC .............................................. 310/77; 310/93

(58) Field of Classification Search
USPC ........... 74/425, 89.14; 310/77, 92, 93; 473/54
See application file for complete search history.

(56) References Cited

U.S. PATENT DOCUMENTS

| | | | |
|---|---|---|---|
| 2,641,139 A * | 6/1953 | Beisner .......................... | 74/425 |
| 3,043,175 A | 7/1962 | Gallob | |
| 3,393,718 A | 7/1968 | King | |
| 3,511,920 A * | 5/1970 | Hertfelder .................. | 192/223.3 |
| 3,866,691 A | 2/1975 | Freeman | |
| 3,889,947 A | 6/1975 | Short | |
| 4,013,235 A | 3/1977 | Halloran, Jr. | |
| 4,035,637 A | 7/1977 | Lenhart et al. | |
| 4,045,024 A | 8/1977 | Breslow et al. | |
| 4,071,240 A | 1/1978 | Camilleri | |
| 4,137,591 A | 2/1979 | Baker | |
| 4,146,223 A | 3/1979 | Stottman | |
| 4,210,242 A | 7/1980 | Mullen | |
| 4,311,177 A | 1/1982 | Kelly | |
| 4,326,712 A | 4/1982 | Camilleri | |
| 4,727,615 A | 3/1988 | Kubo | |
| 4,770,417 A | 9/1988 | Blair | |
| 4,910,073 A | 3/1990 | Tamura et al. | |
| 5,193,804 A | 3/1993 | Smit | |
| 5,219,412 A | 6/1993 | Kubo | |
| 5,238,242 A | 8/1993 | Edwards | |
| 5,331,711 A | 7/1994 | Kelly | |
| 5,429,554 A | 7/1995 | Burkholder | |
| 5,569,092 A | 10/1996 | Rochefort | |
| 5,759,108 A | 6/1998 | Heddon | |
| 5,820,474 A | 10/1998 | Delaney et al. | |
| 5,836,076 A * | 11/1998 | Duta et al. .................... | 29/893.1 |
| 6,533,673 B2 | 3/2003 | Wilson | |
| 6,617,745 B1 * | 9/2003 | Reinartz et al. ............... | 310/247 |

(Continued)

OTHER PUBLICATIONS

AMF Bowling Inc., 82-90XL Pinspotter Motor/Gearbox Repair and Maintenance Manual, Jun. 1994, AMF Bowling Inc.*

(Continued)

*Primary Examiner* — David M Fenstermacher
*Assistant Examiner* — Terence Boes
(74) *Attorney, Agent, or Firm* — Boyle Fredrickson, S.C.

(57) ABSTRACT

A bowling machine motor/gearbox conversion and adaptor kit may allow people to reuse their current gearboxes by adapting the components to utilize a new motor that would make the gearbox universal instead of having different motor/gearbox combinations. The adaptor kit may adapt the gearbox portion of the motor/gearbox assembly to allow the gearbox to accept a current, new motor. A person may use the adaptor kit to repair and replace components of a bowling machine's motor and gearbox assembly.

14 Claims, 3 Drawing Sheets

(56) References Cited

U.S. PATENT DOCUMENTS

| | | |
|---|---|---|
| 7,104,896 B2 | 9/2006 | Wood |
| 7,115,040 B1 | 10/2006 | Thorson |
| 7,360,467 B2 * | 4/2008 | Segawa et al. .................. 74/425 |
| 2004/0162152 A1 | 8/2004 | Augustus |
| 2005/0176516 A1 | 8/2005 | Thorson et al. |
| 2006/0211508 A1 | 9/2006 | Speigl |
| 2008/0064516 A1 | 3/2008 | Raasch et al. |

OTHER PUBLICATIONS

AMF Maintenance & Repair, Aug. 1995.
BFO; Circa 2009.
Franklin Motor, Circa 1996.
Matsushita—National, Circa 1972.
Stahls Marathon, Circa 2000.

* cited by examiner

US 8,754,557 B2

BOWLING MACHINE MOTOR/GEARBOX CONVERSION AND ADAPTOR KIT

CROSS-REFERENCE TO RELATED APPLICATIONS

The present application claims benefit of U.S. Provisional Patent Application No. 61/176,186, filed May 7, 2009, herein incorporated by reference.

BACKGROUND OF THE INVENTION

The present invention relates to motors and gearboxes and, more particularly, to an adaptor kit for providing interchangeability between various motors and gearboxes.

Current bowling machine motor/gearbox assemblies do not provide for adaptation, therefore they are specific to each other in the way they mount to each other. This causes people to purchase complete and unique motor/gearbox assemblies for operation of a bowling machine. When people repair and service bowling machine motor/gearboxes, they experience difficulties in that some components have been discontinued or no longer repairable therefore not allowing them to perform proper maintenance.

For over the past 50 years, bowling machines have utilized seven different manufactures of motors with corresponding gearboxes, with three different gearbox combinations (Backend RH/LH & Combination). Most of the components in these assemblies are unique to each style of manufacturer, thus not allowing interchangeability. Also, with the age of these devices, most of the components have been discontinued making these assemblies non-repairable and non-operational.

As can be seen, there is a need for making different types of motors and gearboxes compatible.

SUMMARY OF THE INVENTION

In one aspect of the present invention, an adaptor kit for connecting a motor with a gearbox assembly comprises of an end bell adaptor adapted to be fastened to the motor; a gearbox assembly adaptor plate adapted to be fastened to the gearbox assembly; and a worm gear shaft mechanically connecting the motor with the gearbox assembly, wherein the end bell adaptor is adapted to mount on the gearbox assembly adaptor plate.

In another aspect of the present invention, an adaptor plate for mounting a bowling machine motor onto a bowling machine gearbox assembly comprises of an end bell adaptor adapted to be fastened to the motor; a gearbox assembly adaptor plate adapted to be fastened to the gearbox assembly; and a worm gear shaft mechanically connecting the motor with the gearbox assembly; a seal housing plate adapted to mount on the gearbox assembly to retain lubricant in the gearbox assembly around the worm gear shaft; wherein the end bell adaptor is adapted to mount on the gearbox assembly adaptor plate, and the motor is not required to be designed specifically for the gearbox assembly.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a bowling machine motor/gearbox conversion and adaptor kit. The adaptor kit of the present invention may allow people to reuse their current gearboxes by adapting the components to utilize a new motor that would make the gearbox universal instead of having different motor/gearbox combinations. The adaptor kit of the present invention may adapt the gearbox portion of the motor/gearbox assembly to allow the gearbox to accept a current, new motor. A person may use the adaptor kit of the present invention to repair and replace components of a bowling machine's motor and gearbox assembly. For example, when replacing the motor, the new motor does not have to be specifically designed for use with the gearbox assembly.

Figure 1:
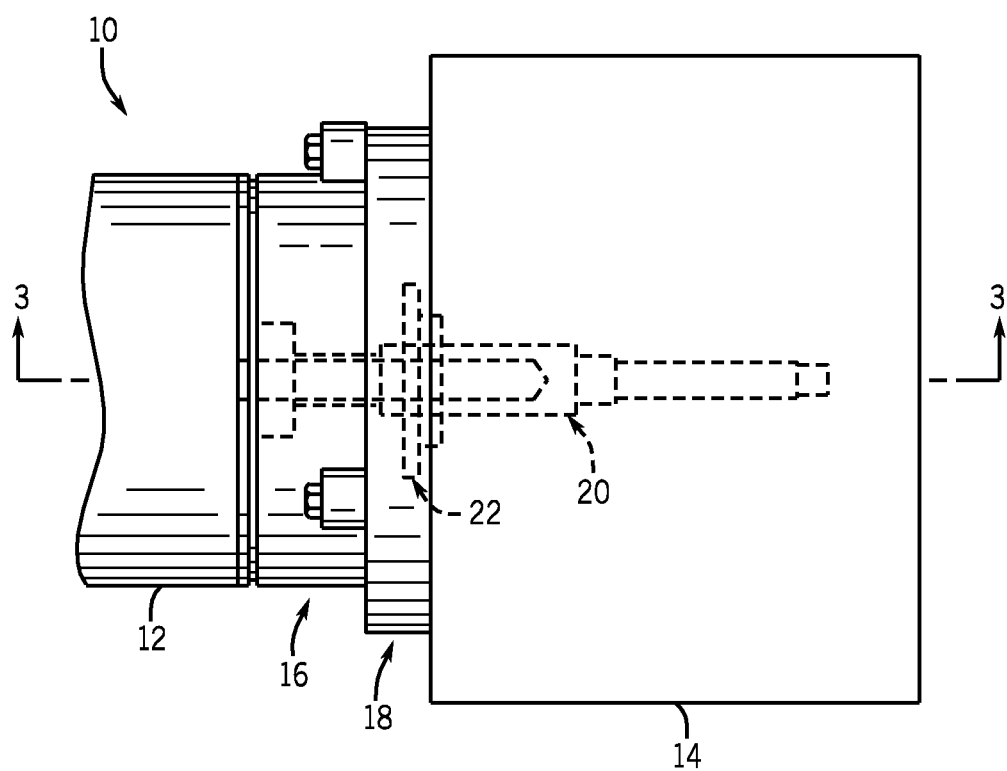
FIG. 1 is a side view of the adaptor kit according to an embodiment of the present invention.
Figure 2:
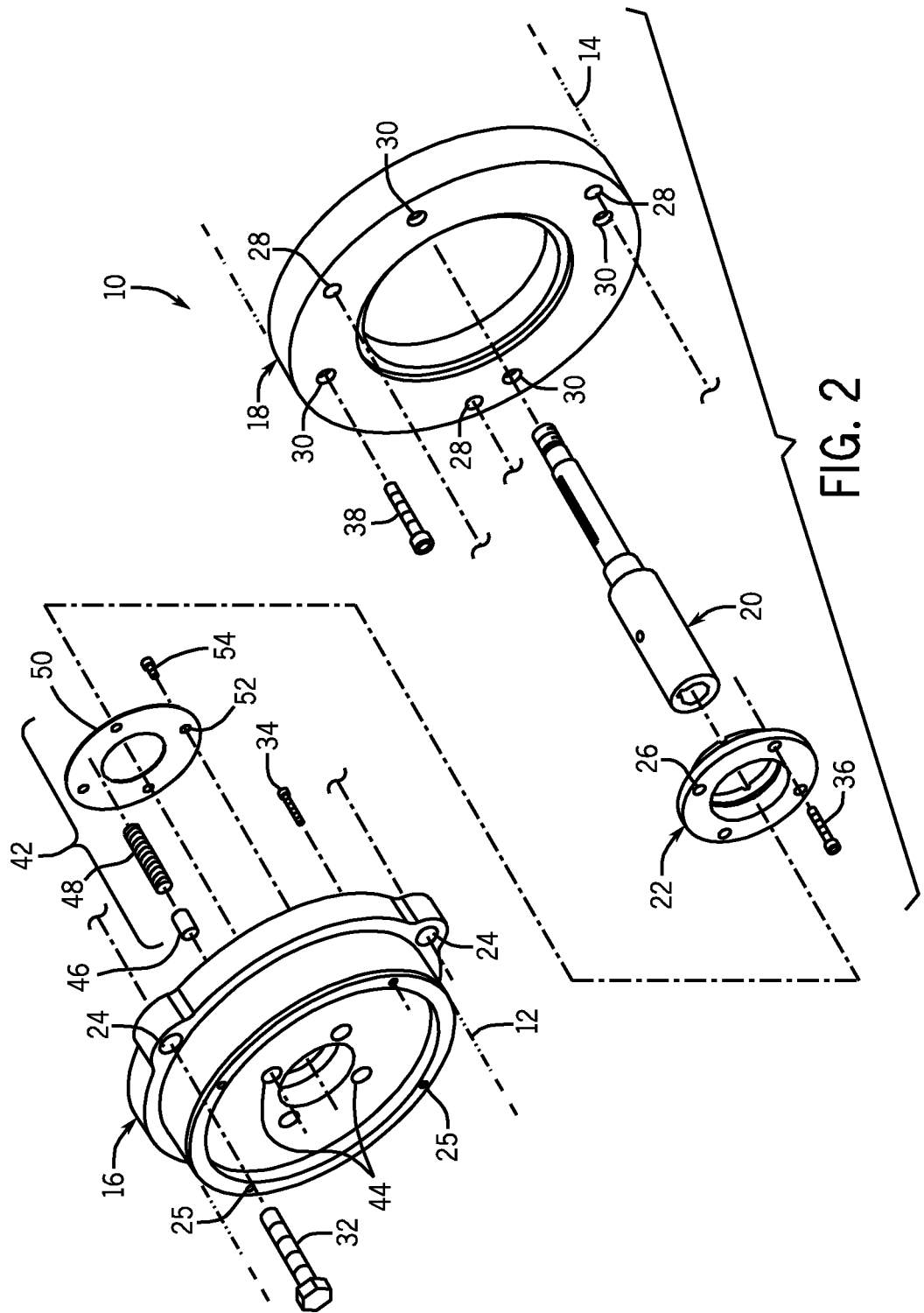
FIG. 2 is a an exploded perspective view of the adaptor kit of FIG. 1.

Referring to FIGS. 1 and 2, an adaptor kit 10 may include an end bell adaptor 16, a gearbox assembly adaptor plate 18 and a worm gear shaft 20. The end bell adaptor 16 may fasten to a motor 12. The gearbox assembly adaptor plate 18 may fasten to a gearbox assembly 14. The worm gear shaft 20 may mechanically connect an output of the motor 12 to an input of the gearbox assembly 14.

The end bell adaptor 16 may be made of steel, brass, titanium, plastic, aluminum, cast steel, cast aluminum, a combination of these materials or a material similar to these materials. In one embodiment of the present invention, the end bell adaptor 16 may be made of aluminum. The end bell adaptor 16 may be between about 178 to 203 cm (7 to 8 inches) in diameter, typically about 180.98+/−0.127-0.381 cm (7.125+/−0.005-0.015 inches). The end bell adaptor 16 may be round, square, hexagonal, octagonal, oval, elliptical or the like. Typically, the end bell adaptor 16 may be round.

The gearbox assembly adaptor plate 18 may be made of steel, brass, titanium, plastic, aluminum, cast steel, cast aluminum, a combination of these materials or a material similar to these materials. In one embodiment of the present invention, the gearbox assembly adaptor plate 18 may be made of aluminum. The gearbox assembly adaptor plate 18 may be between about 178 to 203 cm (7 to 8 inches) in diameter, typically about 180.98+/−0.127-0.381 cm (7.125+/−0.005-0.015 inches). The gearbox assembly adaptor plate 18 may be round, square, hexagonal, octagonal, oval, elliptical or the like. Typically, the gearbox assembly adaptor plate 18 may be round.

Figure 3:
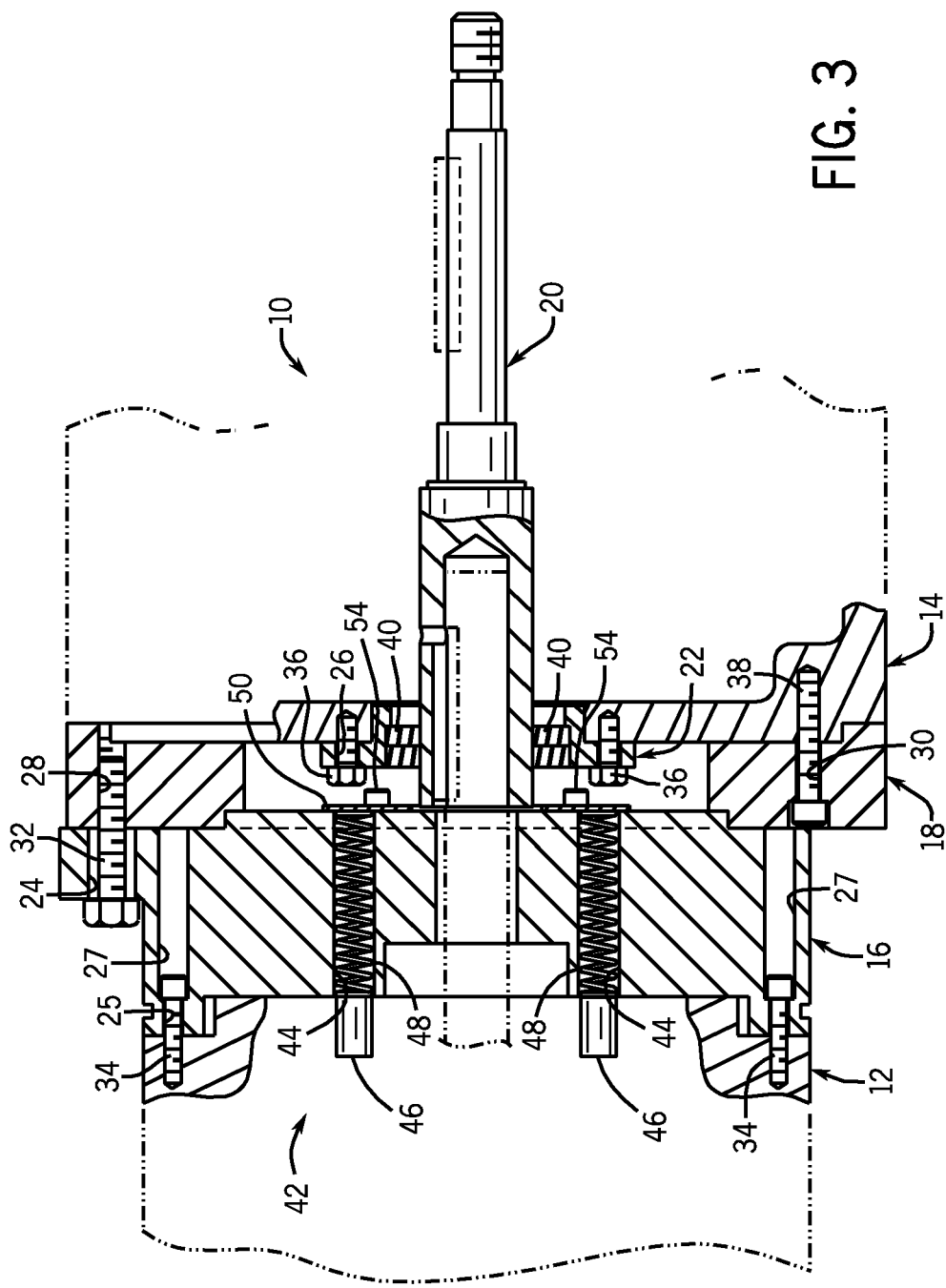
FIG. 3 is a cross-sectional view taken along line 3-3 of FIG. 1.

The worm gear shaft 20 may be fitted into the gearbox assembly 14 to rotationally connect the output shaft of the motor 12 with the gearbox assembly 14. Specifically, as illustrated in FIGS. 2 and 3, the worm gear shaft 30 has an end that is adapted to extend into an interior of the gearbox assembly 14. Also as illustrated in FIGS. 2 and 3, the worm gear shaft 20 further includes an internally keyed end that is adapted to extend over and mate with a portion of an output shaft of the motor 12 that protrudes beyond the axial and of the motor 12. The worm gear shaft 20 may be made of steel, brass, titanium, plastic, aluminum, cast steel, cast aluminum, a combination of these materials or a material similar to these materials. In one embodiment of the present invention, the worm gear shaft 20 may be made of steel. The worm gear shaft 20 may be between about 127.0 to 203.2 cm) about (5 to about 8 inches) in length, typically about 171.45 750+/−0.127-0.381 cm (6.750+/−0.005-0.015 inches).

A seal housing plate 22 may fasten to the gearbox assembly 14 to help retain lubricant inside the gearbox assembly 14, around the worm gear shaft 20. This part may be made of steel, brass, titanium, plastic, aluminum, cast steel, cast aluminum, a combination of these materials or a material similar to these materials. In one embodiment of the present invention, the seal housing plate 22 may be made of steel. The seal housing plate 22 may be between about 2 to about 3 inches in diameter, typically about 68.28 750+1-0.127-0.381 cm (2.688+7-0.005-0.015 inches).

The gearbox assembly adaptor plate 18 may connect to the gearbox assembly 14 using bolts 38 that may pass through holes 30 into the gearbox adaptor plate 18 and mating holes in the gearbox assembly 14. The seal housing plate 22 may connect to the gearbox assembly 14 using bolts 36 that may pass through holes 26 into the gearbox assembly 14. The end bell adaptor 16 may attach to an axial end of the motor 12 by bolts 34 that may pass through holes 25 into the motor 12. The gearbox assembly adaptor plate 18 may have a recessed inside diameter (see FIG. 3) to accept and self align the profiled end bell adaptor 16. Once the end bell adaptor 16 is aligned with the gearbox assembly adaptor plate 18, the bolts 32 may pass through holes 24 in the end bell adaptor 16 and thread into the aligned holes 28 in the gearbox assembly adaptor plate 18 to connect the end bell adaptor 16 to the gearbox assembly adaptor plate 18. It can be seen from FIGS. 2 and 3 that the first and second sets of holes 28 and 30 in the gearbox adaptor plate 18 are offset relative to one another. Also as best seen in FIGS. 2 and 3, the holes 24 in the end bell adaptor 16 are formed in a radial flange of the end bell adaptor 16 and are located radially beyond an outer periphery of the axial end of the motor 12.

Referring to FIG. 3, seals 40 may be disposed between the worm gear shaft 20 and the seal housing plate 22 to help retain lubricant in the gearbox assembly 14. Holes 44 in the end bell adaptor 16 may permit use of an optional braking system 42. Braking system 42 may include springs 48 resiliently pressing brushes 46 toward the motor 12. As clearly seen in the drawings, the springs 48 are the only structures that press against the outer surfaces of the brushes 46. A cover plate 50 may be mounted with screws 54 passing through holes 52 in the cover plate 50 into the end bell adaptor 16. As clearly seen in FIG. 2, the remainder of the cover plate 50, including, the entire portions overlying the holes 52 containing the springs 48, is imperforate.

It should be understood, of course, that the foregoing relates to exemplary embodiments of the invention and that modifications may be made without departing from the spirit and scope of the invention as set forth in the following claims.

I claim:

1. An adaptor for connecting a motor with a gearbox assembly, the adaptor comprising:
   an end bell adaptor adapted to be fastened to the motor;
   a gearbox assembly adaptor plate adapted to be fastened to the gearbox assembly;
   a worm gear shaft mechanically connecting the motor with the gearbox assembly, wherein the end bell adaptor is adapted to mount on the gearbox assembly adaptor plate; and
   a braking system, wherein the braking system includes a plurality of holes in the end bell adaptor, the holes adapted to retain springs resiliently pressing brushes against the motor.

2. The adaptor of claim 1, further comprising a seal housing plate adapted to mount on the gearbox assembly to retain lubricant in the gearbox assembly around the worm gear shaft.

3. The adaptor of claim 2, further comprising a seal between the worm gear shaft and the seal housing plate.

4. The adaptor of claim 1, wherein the gearbox assembly adaptor plate has a recessed inside diameter adapted to accept and self-align a profiled end of the end bell adaptor.

5. The adaptor of claim 1, wherein the end bell adaptor and the gearbox assembly adaptor plate are formed from aluminum.

6. The adaptor of claim 1, wherein the end bell adaptor has a radial flange having mounting holes formed therethrough, each of the mounting holes being located radially beyond an outer periphery of the axial end of the motor.

7. The adaptor of claim 1, wherein, the gearbox assembly adaptor plate has first and second sets of mounting holes therein, the first set of mounting holes being alignable with mounting holes in the end bell adaptor, and the second set of mounting holes being offset from the first set of mounting holes and being alignable with mounting holes in the gearbox assembly.

8. The adaptor of claim 1, wherein the first end of the worm gear shaft is internally keyed and is adapted to extend over and mate with the portion of the output shaft.

9. The adaptor of claim 1, further comprising an annular cover plate mounted on an outer end surface of the end bell adaptor, wherein each of the springs and abuts against an imperforate inner surface portion of the annular cover plate having an area that completely overlies an area of the corresponding hole in the end bell adaptor.

10. The adaptor of claim 1, wherein each of the brushes has an outer surface that is contacted only by the associated spring.

11. An adaptor for mounting a bowling machine motor onto a bowling machine gearbox assembly, the adaptor kit comprising:
   an end bell adaptor adapted to be fastened to the motor;
   a gearbox assembly adaptor plate adapted to be fastened to the gearbox assembly;
   a worm gear shaft mechanically connecting the motor with the gearbox assembly;
   a seal housing plate adapted to mount on the gearbox assembly to retain lubricant in the gearbox assembly around the worm gear shaft; and
   a braking system the braking system including a plurality of holes in the end bell adaptor, the holes adapted to retain springs resiliently pressing brushes against the motor, wherein
   the end bell adaptor is adapted to mount on the gearbox assembly adaptor plate, and
   the motor is not required to be designed specifically for the gearbox assembly.

12. The adaptor of claim 11, wherein the motor is a replacement motor to be mounted on the gearbox assembly.

13. The adaptor of claim 11, further comprising an annular cover plate mounted on an outer end surface of the end bell adaptor, wherein each of the springs abuts against an imperforate inner surface portion of the annular cover plate having an area that completely overlies an area of the corresponding hole in the end bell adaptor.

14. The adaptor of claim 11, wherein each of the brushes has an outer surface that is contacted only by the associated spring.

* * * * *